(12) United States Patent  
Sich

(10) Patent No.: US 6,402,657 B1
(45) Date of Patent: Jun. 11, 2002

(54) INFINITELY VARIABLE FRICTION GEAR

(75) Inventor: Bernhard Sich, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/555,070

(22) PCT Filed: Dec. 4, 1998

(86) PCT No.: PCT/EP98/07894

§ 371 (c)(1),
(2), (4) Date: May 24, 2000

(87) PCT Pub. No.: WO99/30059

PCT Pub. Date: Jun. 17, 1999

(30) Foreign Application Priority Data

Dec. 10, 1997 (DE) .......................... 197 54 725

(51) Int. Cl.[7] .............................. F16H 15/38
(52) U.S. Cl. ........................... 476/42; 476/10
(58) Field of Search .............. 476/10, 40, 42

(56) References Cited

U.S. PATENT DOCUMENTS

| 1,833,475 A | 11/1931 | Standish |
| 2,152,796 A | 4/1939 | Erban |
| 3,164,025 A | 1/1965 | Francisco, Jr. |
| 3,299,744 A | 1/1967 | Kraus |
| 3,739,658 A | 6/1973 | Scheiter |
| 4,526,051 A | 7/1985 | Kraus |
| 4,614,125 A | 9/1986 | Okoshi |
| 4,893,517 A | 1/1990 | Nakano |
| 4,955,246 A | 9/1990 | Nakano |
| 4,960,004 A | 10/1990 | Hibi et al. |
| 5,136,890 A | 8/1992 | Hibi et al. |

FOREIGN PATENT DOCUMENTS

| EP | 0 172 023 A1 | 2/1986 |
| EP | 0 459 291 A1 | 12/1991 |
| JP | 10-274300 | * 10/1998 |

* cited by examiner

*Primary Examiner*—Allan D. Herrmann
(74) *Attorney, Agent, or Firm*—Davis & Bujold, P.L.L.C.

(57) ABSTRACT

The friction gear has an input shaft (3) an a torque shaft (20) arranged in a position coaxial thereto, two input disks (5, 12) and output disks (6, 11) disposed in pairs and between which friction wheels are placed and fastened to carriers (26). In the upper section (39) of the housing of the gear recesses (35) are provided in which the upper ends (36) of the carriers (26) engage with play.

3 Claims, 3 Drawing Sheets

INFINITELY VARIABLE FRICTION GEAR

The invention concerns an infinitely variable friction gear.

BACKGROUND OF THE INVENTION

Such infinitely variable friction gears usually have situated, coaxially to a common shaft input and output disks, mutually arranged in pairs and having their inner surface toroidally shaped, the same as friction wheels disposed between the pairs of input and output disks. The friction wheels are in frictional contact both with the input disks and the output disks and transmit by frictional contact to the output disk the torque transmitted to them by the input disk, the rotational speed of the friction wheels being higher the distance between their contact points and the input disk and axis of rotation. The rotational speed of the output disks, on the other hand, is higher the nearer the contact point between friction wheel and output disk lies on the axis of rotation. Consequently, by the swinging of the friction wheels, the rotational speed of the output disks can be infinitely variably and arbitrarily adjusted. For this purpose, the axes of rotation of the friction wheels are supported on a carrier controllable via a swinging device.

The basic principle of such an infinitely variable friction gear has already been described in U.S. Pat. No. 2,152,796 published in the year 1939. In this publication are provided two pairs of concave input and output disks between which tiltably supported friction wheels are disposed so that a torque transmitted via an input shaft to the input disks and the friction wheels, depending on the relative position of the friction wheels with a reduction ratio dependent thereon, is fed via the output disks, a gear step and a hollow shaft to a summarizing gear in the form of a planetary gear. The web of the planetary gear drives an output shaft connected with the input gears such as a motor vehicle. The output shaft can be disposed parallel to the input shaft and spaced therefrom. The output gear and both output disks are pivoted on a sleeve which rests by its ends on bearing brackets. The arrangement of the gearing brackets, respectively, between one input and output disk presupposes a sufficiently large space between the disks.

The gear according to U.S. Pat. No. 3,739,658 also has a pull-and push variator with two input and output disks disposed in pairs between which are placed pivotally supported friction wheels. This construction includes a bearing bracket which is a component part of the housing and is spatially situated horizontally between the two output disks. The power flowing out of the output disks is fed to a hollow shaft, via a planetary gear, that also acts as differential. The hollow shaft is non-rotatably retained by ball bearings in the bearing bracket.

The output gear is in driving connection with a gear which is non-rotatably fastened on the housing of a torque converter. The latter drives the output shaft of the gear. The arrangement of the torque converter at the entrance of the output shaft implies a relatively large axial space between input and output shafts of the gear. This extensively limits the utilization of the gear, since the required installation space is not always available.

U.S. Pat. No. 4,893,517 has disclosed an infinitely variable friction gear having one input shaft which penetrates in a housing. The housing is divided by means of a partition wall in two cavities in each of which are supported one input disk and opposite to it one output disk with friction wheels therebetween, wherein both the input disk and the output disk lie in both cavities upon a common axis relative to which the friction wheels can swing to achieve the desired speed ratio. Both pairs of input disks and output disks are situated in the cavities with mirror symmetry to each other in a manner such that both output disks lie side by side and this at both sides of the partition wall that divides the two cavities from each other and in which is supported one gear which is actuated by the two output disks jointly with the output torque.

The problem to be solved by this invention is to reduce the construction expenditure of such an infinitely variable gear and to lower the production cost.

SUMMARY OF THE INVENTION

The invention solves the stated problem in a generic infinitely variable friction gear.

The advantages achievable by the invention consist in the use of considerably less stationary and movable parts.

The invention is explained with reference to the drawings which shows:

BRIEF DESCRIPTION OF THE DRAWINGS

In FIG. 1 is shown a section through an infinitely variable gear of which only those parts essential for the understanding of the invention will be described below.

DESCRIPTION OF THE PREFERRED EMBODIMENTS

Figure 1:
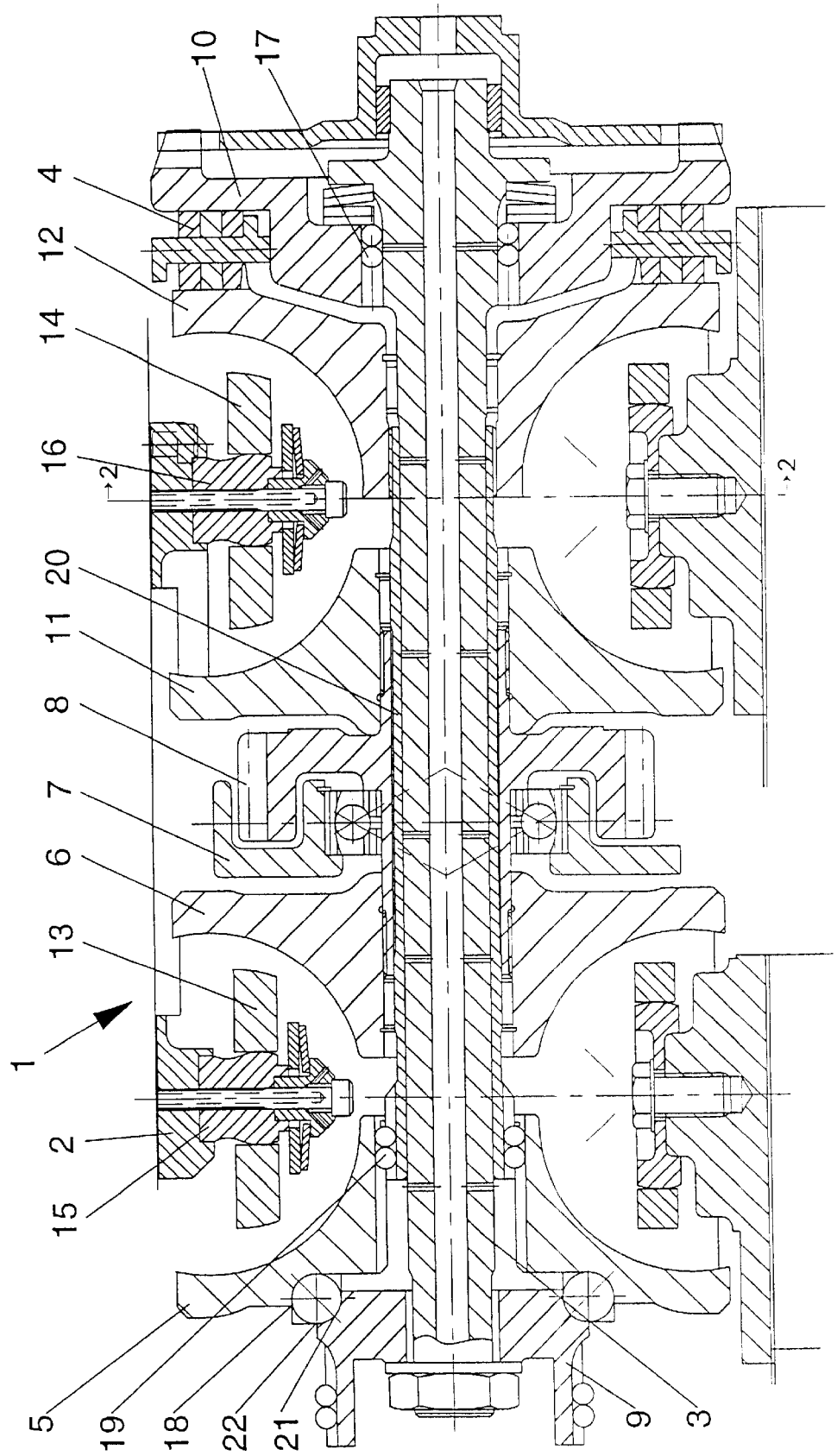
FIG. 1 an axial section through a conventional friction gear.

The friction gear 1 (or toroidal gear) has one input shaft 3 connected with a starting element (not shown), such as a torque converter or a wet-running starting clutch of a prime mover of a motor vehicle. The gear contains two gear units disposed coaxially to the input shaft 3. One gear unit has one input disk 5 and one output disk 6, the surfaces of which face each other have a toroidal shape; the other gear unit has one input disk 12 and one output disk 11, the surfaces of which face each other likewise have a toroidal shape. In each of the two gear units, two friction wheels are preferably provided which are fastened on tiltable carriers; the friction wheels are in frictional contact with the two surfaces facing them of the input disks 5, 12 and of the output disks 6, 11, the friction wheels of each gear unit being disposed symmetrically to the axis of the input shaft 3.

If the friction wheels are now inclined by the swinging device (not shown in detail), relative to the longitudinal axis of the input shaft 3, then the contact points of the periphery of the friction wheels move whereby the reduction ratio between an input and an output speed can be continuously adjusted, i.e. infinitely variable.

The disks 5, 6, 11, 12 are supported on a torque shaft 20 slightly movable in an axial direction relative to the input shaft. The input disk 5 of one gear unit is non-rotatably connected with the torque shaft 20, but axially sliding thereon via a spherical ball-spline 19. The input disk 12 of the other gear unit is also non-rotatably connected by engaging gears with the torque shaft 20. Both output disks 6, 11 of both gear units are disposed with mutual mirror symmetry and side by side in the gear and placed upon a common bushing, the output disk 11 being firmly connected with a gear 8 that rotatably surrounds the torque shaft 20. One torque transmitted by one input disk 5 to the output disk 6 and one torque transmitted by the other input disk 12 to the output disk 11 is transmitted by the two output disks non-rotatably connected with the bushing to the gear 8 which meshes with a gear (not shown), of an output shaft.

A roller-shaped cam clamping device 4, which is provided between the input disk 12 with a disk with cam plate 10 and which is supported moveably in axial direction upon the input shaft 3 and non-rotatably connected therewith wherein, with the aid of the clamping device 4, it actuates the input disk 12 in axial direction relative to the output disk 11. The disk 10 is supported on the input shaft by a ball spline 17.

An axial flange 9 on which the input disk 5 supports itself via a universal bearing 18. Besides, the input disk 5 is axially movably supported on the torque shaft 20 by a ball spline 19 which ensures a non-rotatable connection with the torque shaft.

The universal bearing 18, which replaces the conventional axial bearing and the conventional radial bearing of the input disk 5, absorbs all radial and axial forces that act upon the input disk 5. It is preferably shaped as a ball bearing which, on one side, engages in a semicircular recess 21 integrated in the input disk and, on the other side, on a complementarily developed recess 22 in the axial flange 9. The two recesses are advantageously vertically offset relative to each other.

A cup-shaped bracket member 7 in which the gear 8 is supported separates the two gear units from each other. The upper transverse yokes 13, 14 and with pivots 15, 16 for the carriers of the friction wheels are fastened in the holding frame 2 by an adequate fastening device.

Figure 2:
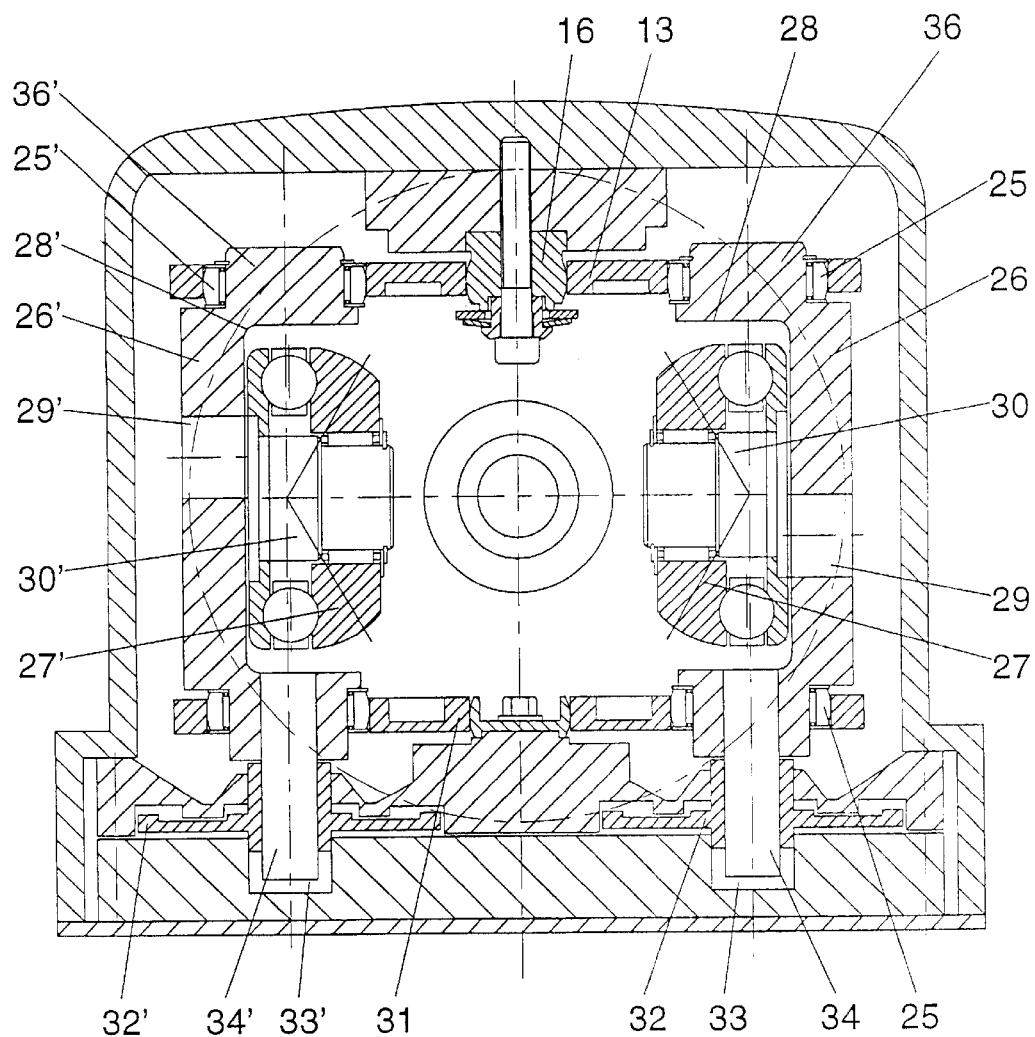
FIG. 2 a radial section along line 2—2 of FIG. 1.

From the radial section shown in FIG. 2 is understood that the carriers 26, 26', in which are eccentrically supported the friction wheels 27 that belong to a gear unit, penetrate by their upper ends 36, 36' corresponding openings in the upper transverse yoke 13. The ends 16 are conventionally provided with upper bearings 25, 25' having arched surfaces, since the carriers 26, 26' can perform swinging motions. To accommodate the upper transverse yoke 13, the fastening pivot 16 is likewise provided with an arched outer surface on which the opening of the transverse yoke 13 touches it.

The friction wheels 27, 27' are inserted in recesses 28, 28' in the carriers 26, 26' and eccentrically supported therein, the eccentric section 29, 29' penetrating the carriers 26, 26' and the eccentric section 30, 30' carrying the friction wheels 27, 27'.

The undersides of the carriers 26, 26' penetrate the lower transverse yoke 31, there being also provided bearings 25 with arched outer surface on which abut the edges of the recess provided in the lower transverse yoke 31. Moreover, each carrier is downwardly extended by a bracket 34, 34' which is firmly connected with a hydraulically actuatable piston 32, 32' so that, with corresponding actuation of the piston top side or of the piston underside, a slight raising or lowering of the whole carrier 26, 26' can be carried out; the travel usually amounts to about 2 mm.

Figure 3:
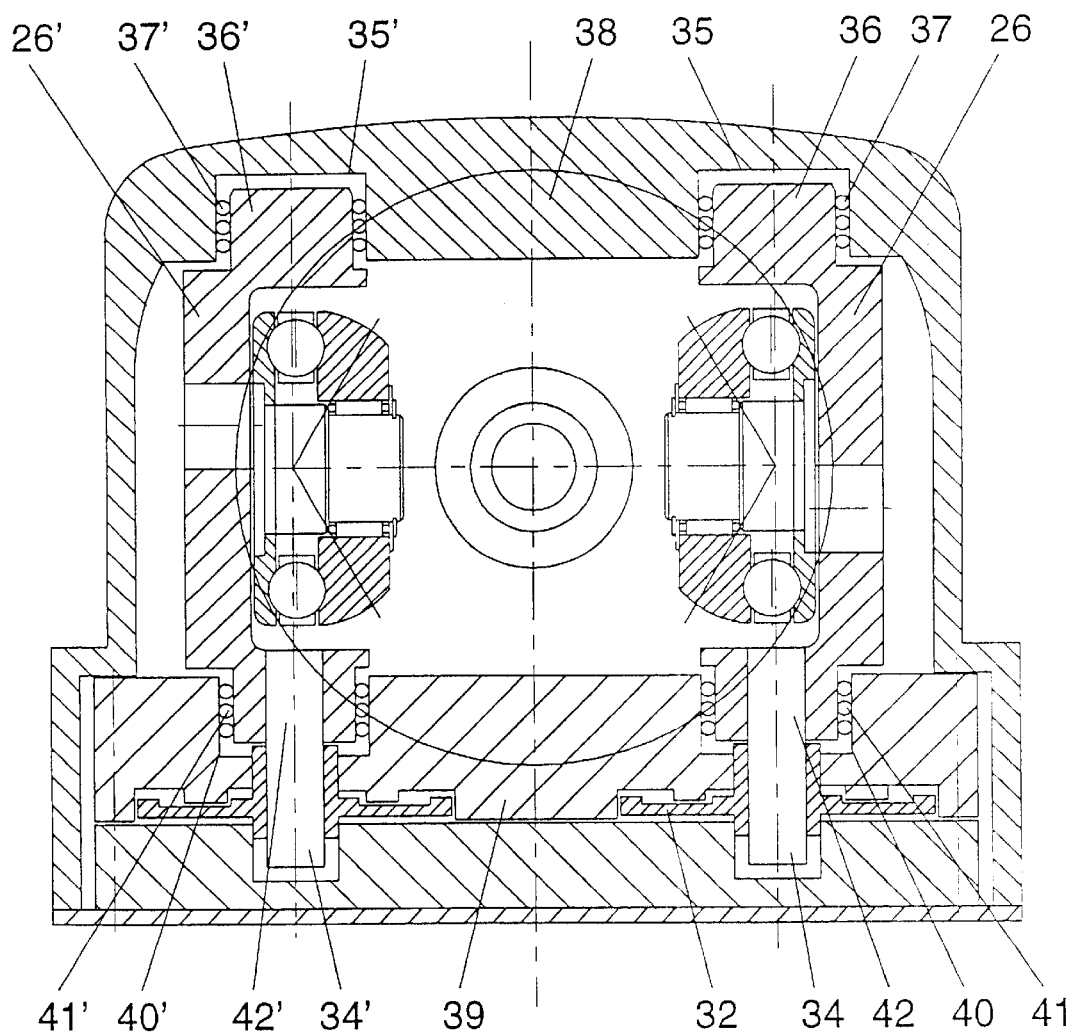
FIG. 3 a radial section along the same line through a friction gear developed according to the invention.

FIG. 3 now shows the radial section through an extensively simplified carrier support in the infinitely variable friction gear developed according to the invention. In the top section of the housing 38, two recesses 35, 35' are provided here in which engage the upper ends 36, 36' of the carriers 26, 26'. Between the vertical sections of the recesses 35, 35' and the ends 26, 26', a bearing 37, 37' is provided which can be designed as low-friction bearing or ball bearing. The bearing 37 makes it possible for the carrier 26 to be capable of freely turning in the recess 35, the same as the raising or lowering of the whole carrier 26 produced by the hydraulic piston 32 as result of the play provided between the upper side of the end 36 and the opening 35.

On the underside of the housing 38 is provided a fixture 39 firmly connected therewith in which recesses 40, 40' are likewise integrated in which engage the lower ends 42, 42' of the carriers 26, 26' which are connected with the brackets 34, 34'. Corresponding low-friction or ball bearings 41, 41' are also provided here between the ends 42, 42' of the carriers and the recesses 40, 40'.

The invention also offers a considerable simplification in the construction of an infinitely variable friction gear, since the upper and lower pivots with the appertaining fastening devices and the upper and lower transverse yokes can be omitted. The support of the carriers is considerably stiffer; the production cost is also reduced thereby, since less parts and above all less moved parts are needed.

Reference Numerals 1 gear
2 holding frame
3 input shaft
4 clamping device
5 input disk
6 output disk
7 bracket member
8 gear
9 axial flange
10 disk with cam plate
11 output disk
12 input disk
13 upper transverse yoke
14 upper transverse yoke
15 pivot
16 pivot
17 ball spline arrangement
18 universal bearing
19 ball spline arrangement
20 torque shaft
21 recess
22 recess
25 upper bearing
25' upper bearing
26 carrier
26' carrier
27 friction wheels
27' friction wheels
28 recess
28' recess
29 eccentric section
29' eccentric section
30 eccentric section
30' eccentric section
31 lower yoke
31' lower yoke
32 hydraulic piston
32' hydraulic piston
33 guide braces
33' guide braces
34 bracket
34' bracket
35 recess
35' recess
36 upper end
36' upper end
37 bearing 37' bearing
38 housing
39 fixture
40 recess
40' recess
41 bearing
41' bearing
42 lower end
42' lower end

What is claimed is:

1. An infinitely variable friction gear comprising:

an input shaft (3);

a torque shaft (20) arranged coaxially thereto;

two input disks (5, 12) arranged coaxial with the input shaft, and the two input disks (5, 12) having toroidal surfaces;

two output disks (6, 11) arranged back to back, in mirror image symmetry, coaxial with respect to the input shaft, and the two output disks (6, 11) having toroidal surfaces, and each one of the two input disks (5, 12) is paired with one of the two output disks (6, 11) to form two pair of input and output disks;

a plurality of friction wheels pivotally supported by a carrier (26, 26'), the plurality of friction wheels being located between the toroidal surfaces of the two pair of input and output disks for transmission of torque from the input disks to the output disks;

a device (4) for urging at least a first one of the input disks (12) toward the output disks;

a gear located between the two output disks for rotation therewith; and an axial flange (9) connected with the input shaft (3), and a second one of the input disks (5) being at least partially supported by axial flange (9);

wherein the infinitely variable friction gear has a housing, upper recesses (35, 35') are formed in an upper section (38) of the housing, and each upper recess (35, 35') accommodates a bearing (37, 37') therein to facilitate at least one of rotation and axial motion of an upper portion (36, 36') of the carrier (26, 26') received within the recess (35, 5').

2. The friction gear according to claim 1, wherein lower recesses (40, 40') are formed in a fixture (39) connected with a lower surface of the housing, and each lower recess (40, 40') accommodates a bearing (41, 41') therein to facilitate rotation and axial motion of a lower portion (42, 42') of the carrier (26, 26') received within the recess (40, 40').

3. The friction gear according to claim 1, wherein lower recesses (40, 40') are formed in a lower region of the housing, and each lower recess (40, 40') accommodates a bearing (41, 41') therein to facilitate rotation and axial motion of a lower portion (42, 42') of the carrier (26, 26') received within the recess (40, 40').

* * * * *